B. F. Partridge,
Rake,
Nº 3,482.    Patented Mar. 13, 1844.
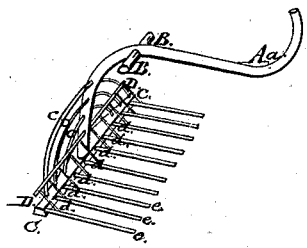
Witnesses:
Hervey Smith
John Leatherly
Inventor:
B. F. Partridge

UNITED STATES PATENT OFFICE.

BENONI F. PARTRIDGE, OF ONONDAGA, NEW YORK.

IMPROVEMENT IN GRAIN-RAKES.

Specification forming part of Letters Patent No. 3,482, dated March 13, 1844.

*To all whom it may concern:*

Be it known that I, BENONI F. PARTRIDGE, of the town of Onondaga, and county of Onondaga, and State of New York, have invented a new and useful Improvement in the Form and Construction of a Rake or Instrument for the Gathering of Grain of all Kinds into Bundles or Sheaves from the Swath; and I do hereby declare that the following is a full and exact description.

The nature of my invention consists in providing an instrument by which one regular draft or stroke a sheaf of grain can be collected with perfect cleaness on the bed of the swath, evenness of straw, and without the necessity of shelling out the grain, as is usual with the common rake.

To enable others to make and use my invention, I will proceed to decribe its construction as follows:

My handle or stale is formed of a stick of natural or artificial bend, commencing at the head of the rake with a slight curvature and gradually increasing about two feet, when the bend is increased to near a quarter-circle; thence for about two feet with a very slight bend upward, when I suddenly bend it so as to have the extreme end of the stale in nearly a perpendicular position, affording an easy hold for the upper hand of the operator, (see letters A *a* on engraving,) while his lower hand is on a double thole about two feet from the head of the rake, and by which he draws the instrument forward. The object of the double thole is that the operator can work on either side of his rake at pleasure ; or, in other words, allows him to change hands as his ease or necessity may dictate, (see B B.)

The head or main beam of the rake is formed of strong and durable timber, about two and a half feet long, (or as may be desired as to length,) and bored for the reception of the teeth, as the common rake, and of a size sufficient to afford strength to the instrument. I use from ten to sixteen teeth of from one foot to two feet in length, as may be deemed proper, or according to the weight of the grain to be collected. The diameter of the teeth is from three-fourths to a half inch. The size of the head is in proportion to the length and number of teeth used, and is largest at the centre or insertion of the stale. I use a counter-beam, which passes through the stale about six inches from the main head, of the same length as the main head, but much smaller, from which I extend braces to the teeth, thereby strengthening them and preventing the grain from becoming entangled in any part of the instrument. I use three bows, extending from the main head through the counter-head and stale to the opposite end of the head, the same as bows are used in the common rake. These bows operate as braces to strengthen the instrument and keep the head from swaying. I sometimes use wire for my bows, and also for the braces, which extend from the counter-head to the teeth, (see letter *d d*, &c.)

Having given a description of the several pieces of which my rake is composed in a general manner, I will now briefly recapitulate the same.

I use a head from two to three feet in length, in which I insert the bent end of my teeth and stale and bows, as in the rake now in use. I use a counter-beam, which is of smaller size, and passes through the stale about five inches from the main head. Through this counter-head the three bows are passed on each side of the stale, and from this beam braces are extended through the teeth, thereby preventing them from springing and warping about during the using of it. My stale, curved as before described, passes through the main head and is of size sufficient to admit the counter-beam to pass through it about five inches from the main head, and also the three bows aforesaid. The teeth are each braced from the counter-beam. The double thole is placed on the stale about two feet from the head, and in using it the operator uses one hand on the thole and the other near the end of the handle, and with one steady movement of the rake accumulates a sufficient quantity of grain for a sheaf, and as the movement has been steady and uniform the grain is collected without any portion of it being shelled and with much greater speed than can be done with the rake in common use, and at the same time it enables the operator to do his work much cleaner and in a nicer manner and with much greater ease to the laborer. I might use a stale with a different curvature with similar benefits; and I claim as my invention the general characteristics and form of the foregoing-described instrument, as set forth by the accompanying model and specification.

Letter A represents the stale; B B, the double thole; C C, the main head; D D, the counter-head; c c c, the bows; d d d, &c., the braces from the counter-head to the teeth; e e e, &c., the teeth.

What I claim as my invention, is—

The combination of a grain-rake of the above-described construction, with a curved handle, said handle being curved in the manner set forth, or any other substantially the same in which the operation would not be changed, the whole operating as set forth.

B. F. PARTRIDGE.

In presence of—
HERVEY SMITH,
JOHN FEATHERLEY.